Oct. 1, 1957 A. I. BRATTON 2,807,930
PURIFICATION OF EXHAUST GASES
Filed Feb. 23, 1955
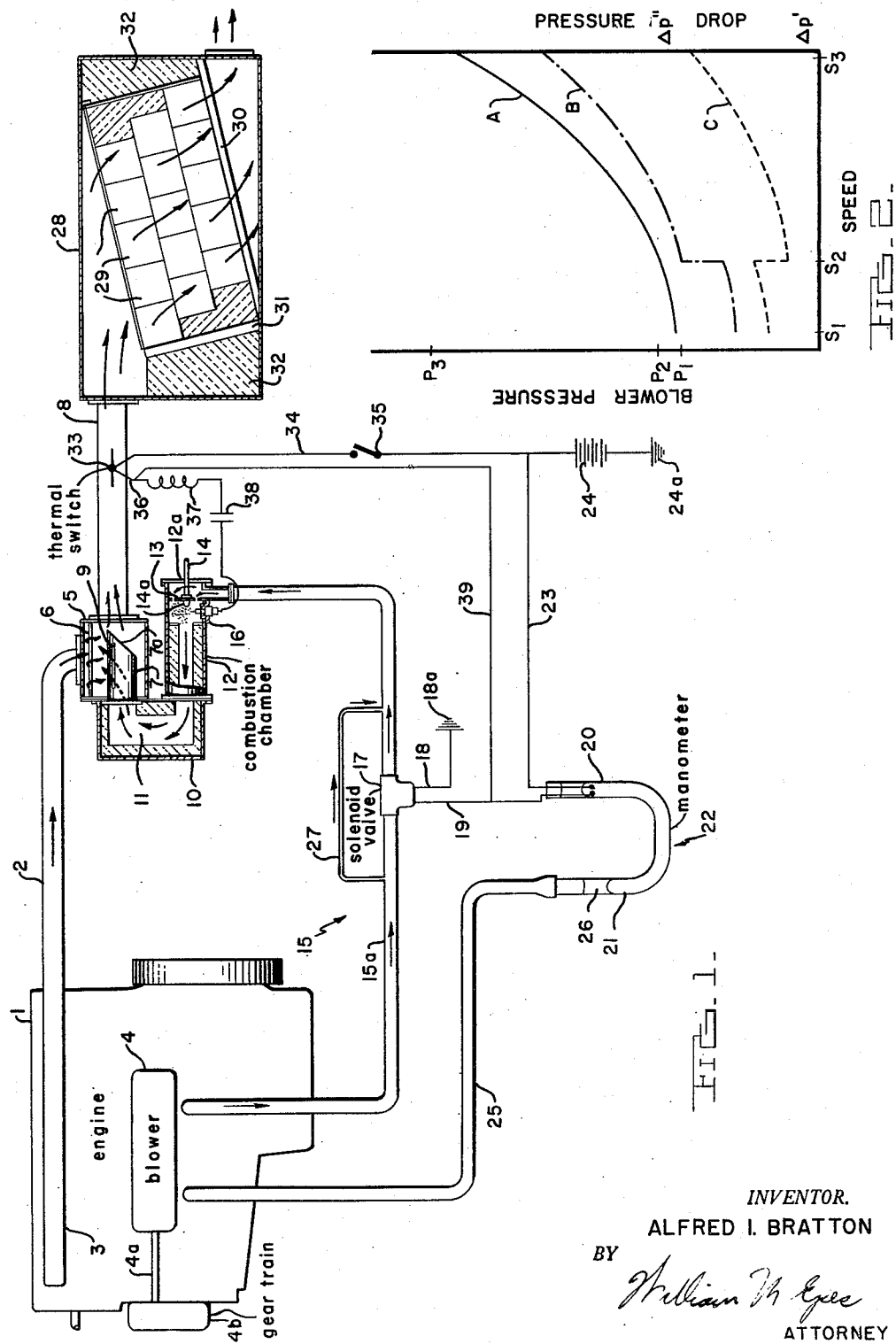
INVENTOR.
ALFRED I. BRATTON
BY
William M. Gee
ATTORNEY

United States Patent Office 2,807,930
Patented Oct. 1, 1957

2,807,930

PURIFICATION OF EXHAUST GASES

Alfred I. Bratton, Broomall, Pa., assignor to Oxy-Catalyst, Inc., a corporation of Pennsylvania Application February 23, 1955, Serial No. 489,996

7 Claims. (Cl. 60—30)

This invention relates to catalytic exhaust purification systems for internal combustion engines particularly, but not necessarily exclusively, of the diesel type.

The exhaust gases produced by diesel engines are extremely offensive particularly when a relatively large volume of such gases is released within a confined area. These gases contain a large variety of offensive components including tars, aldehydes, organic acids and free carbon in varying concentrations depending upon the engine speed and load. Some of these contaminants such as the aldehydes, tars and organic acids are suspected as a health hazard and are additionally extremely offensive because of their odors. The free carbon contained in diesel exhausts is objectionable in that it renders the exhausts extremely smoky and thereby produces a large amount of dirt.

The presence of such contaminants in diesel exhausts prohibits absolutely, or at least limits, the use of diesel engines in confined areas such as mines and warehouses. Furthermore, the current trend towards more widespread use of diesel engines in passenger buses and trucks is causing an urban air pollution problem of growing concern. While the use of a single diesel bus or truck might have little effect on the overall air pollution problem of a city, the continual operation of a large number of buses and trucks will contribute materially to the problem.

A practical solution to the problem of diesel engine exhausts is set forth in the copending application of Eugene J. Houdry, Serial No. 414,838, filed March 8, 1954 for "Device for Catalytically Oxidizing Exhaust Fumes of Internal Combustion Engines, Particularly Diesel Engines." The invention disclosed in that application provides for the elimination of offensive and otherwise objectionable components of diesel exhausts by passing them over an oxidation catalyst. If this is done in accordance with the teachings of the aforementioned Houdry invention, the oxidizable components of the exhaust gases will be substantially eliminated by their being oxidized to produce water vapor and $CO_2$, both of which are completely innocuous.

As explained in detail in application Serial Number 414,838, practical, presently available oxidation catalysts are operative only at relatively elevated temperatures. The preferred gas stream temperature for catalytic oxidation will vary somewhat depending upon such factors as the concentration of oxidizable components in the gas stream and the nature of these oxidizable components. Where diesel exhausts are being catalytically purified, the gases entering the catalyst should be within the temperature range of about 700–1300° F. and preferably in the range of about 900–1100° F.

In normal operation, diesel exhaust gases seldom, if ever, attain these temperature levels. The exhaust gas temperature of a 2-cycle diesel engine will vary from about 200 to 250° F. at idle to about 750° F. at full load. In the case of a 4-cycle engine the exhaust gas temperature will vary from about 250° F. at idle to about 1100° F. at full load. It is thus apparent that only in the case of a 4-cycle diesel engine operating at full load or under relatively heavy load are the exhaust gases amenable to catalytic oxidation insofar as temperature requirements are concerned.

In the aforementioned Houdry application Serial No. 414,838 provision is made for heating diesel exhausts prior to catalytic oxidation by admixing therewith combustion products by flame combustion of an air-fuel mixture within a combustion chamber. Initial ignition of the air-fuel mixture is effected by means of a spark and the combustion products from the burning flow into the pipe carrying the exhaust gases. With this system even the low temperature exhausts produced under idling conditions can readily be heated to a temperature level at which the oxidizable and objectionable components thereof will be eliminated. The combustion chamber must be supplied with combustion air under a moderate positive pressure to overcome the pressure of the exhaust gases and to assure admixture of the combustion products with the exhaust gases.

The present invention relates particularly to the burning of the air-fuel mixture, to the ignition of this mixture and to the provision of an air supply for the combustion process.

It is the object of the invention to provide air supply means to the combustion chamber of the catalytic exhaust purification system of an internal combustion engine.

It is a further object of the invention to provide means for igniting an air-fuel mixture within the combustion chamber of the catalytic exhaust purification system of an internal combustion engine.

Further objectives of the invention will be apparent from the following description and from the annexed drawings in which:

Fig. 1 is a diagrammatic view of a preferred embodiment of the invention.

Fig. 2 is a series of curves illustrating some of the principles of the invention.

The present invention is applicable with internal combustion engines having associated therewith air compressing means for supplying air under pressure to the engine cylinders. In the case of a 2-cycle diesel engine such air compressing means is required for the purpose of scavenging the engine cylinders of exhaust gases. Also, in some 4-cycle engines such air compressing means is provided for supercharging purposes in order to increase the maximum power output of the engine. Usually the air compressing means takes the form of a blower either of the Roots or of the axial flow type or in some cases a turbo-compressor operating on the engine exhausts is provided. Roots or axial flow blowers are generally geared to or are otherwise mechanically responsive to the engine power shaft and, as a result develop air pressures varying with the speed of the engine. Turbo-compressors are also responsive to the engine speed and develop considerably higher pressures at high engine speeds (when the volume and pressure of the exhausts produced is highest), than at intermediate or low engine speeds. With either a blower or a turbo-compressor, then, relatively high air pressures will be developed when the engine is operated at high speeds as compared with low speed or idling conditions.

It has been found that the air compressing means associated with a diesel engine can be utilized as a source of air under a slight positive pressure for the combustion chamber of a catalytic exhaust purification system of the general type described in the aforementioned Houdry application. However, it has also been found that this air supply system must in some way be regulated. The air pressures developed at low engine speeds are generally sufficient for the needs of the combustion chamber but at high engine speeds, when relatively high air pressures are developed, the air pressures developed are excessive and tend to cause blow-out of the flame in the combustion chamber. One aspect of the instant invention concerns the regulation of the air supply for the combustion chamber in accordance with the varying pressures developed.

In the practice of the instant invention the exhaust gases from the internal combustion engine are mixed with combustion products produced by the burning of an air fuel mixture in a combustion chamber. Air under a relatively low positive pressure is supplied by suitable conduit means to this combustion chamber from the above described air compressing means associated with the engine. A valve in the conduit means limits or restricts the flow of compressed air through the conduit means during periods of high engine speed operation with attendant development of relatively high air pressures. At low engine speeds, on the other hand, the valve permits utilization of the full effect of the air pressures developed by the air compressing means for supplying combustion air to the combustion chamber. In this manner, sufficient quantities of air are provided for combustion at all times while the introduction of a stream of high pressure air into the combustion chamber during times of development of high pressures by said air compressing means is prevented. As is explained more fully below, the valve which effects this variation is preferably responsive to the air pressures developed by the air compressing means although alternative arrangements, such as a valve directly responsive to the engine speed, are contemplated as being within the scope of the invention.

A further aspect of the invention concerns initial ignition of the air-fuel mixture in the combustion chamber when the engine is started and re-ignition in the event that the flame is extinguished during running of the engine. When the engine is started it is, of course, desirable to immediately start the combustion process in the combustion chamber in order to permit catalytic purification of the engine exhausts to proceed. To this end the invention provides electrical ignition means in the combustion chamber controlled by a temperature sensitive switch. The temperature sensitive switch is, in turn, responsive to the temperature of the gases entering the catalyst in such manner as to energize the ignition means at low temperatures (which condition exists when no combustion is taking place in the combustion chamber) and to de-energize the ignition means at high temperatures (which condition would exist when fuel is being burned in the combustion chamber). In order to provide optimum air flow to the combustion chamber during start up and ignition of the air-fuel mixture, the previously mentioned valve, which controls air flow to the combustion chamber, is preferable electrically actuated and electrically connected to the aforementioned temperature sensitive switch. By virtue of this arrangement, air flow is limited and a rich air-fuel mixture is provided while the combustion process is being initiated. If during operation of the engine the flame should be extinguished, the temperature sensitive switch will, of course, close in response to the resultant decreased gas temperature. Under these circumstances the ignition means will again be energized and the valve closed to permit re-ignition within the combustion chamber.

These and other aspects of the invention will be apparent from the following description of the disclosed embodiment of Fig. 1 in which the reference numeral 1 indicates a 2-cycle diesel engine having an exhaust manifold 3 and exhaust pipe 2 associated therewith. Scavenging air is supplied to the engine cylinders by means of a blower 4 which is operated by means of a power shaft 4a. The power shaft is suitably connected to the engine cam shaft by means of a gear train in housing 4b. The blower 4 may be either of the axial flow type or of the conventional Roots type which consists of two rotors having intermeshing lobes. Exhaust pipe 2 enters a gas mixer 5 containing a deflector plate 6 extending partially across the upper portions thereof. A truncated cylindrical insert 7 slotted as indicated by reference numeral 9, extends into the central portion of gas mixer 5, and a combustion tunnel 10 having a refractory-lined passage 11 therein is suitably secured to mixer 5 in such manner that one of the open ends of passage 11 opens into the open end of insert 7 which is closed at its opposite end 7a. The opposite end of passage 11 opens into a refractory lined combustion chamber 12 provided with an apertured plate 13 adjacent its closed end 12a. A fuel line 14 extends through this closed end of the combustion chamber, through plate 13 and terminates in a nozzle 14a. This line is preferably adapted to supply diesel fuel from the engine fuel tank and may be associated with the fuel supply system of the engine. Alternatively, a separate fuel pump may be provided for pumping fuel through line 14. Air under a pressure of about 2 to 15 inches of mercury, is supplied by conduit means 15 which opens into combustion chamber 12 beneath plate 13. Ignition means, which may take the form of a spark plug 16 is provided adjacent nozzle 14a.

Conduit means 15 extends from the intake manifold (which is within the engine block) to chamber 12 and thereby permits utilization of the engine air compressing means as a source of compressed air for the combustion of the fuel in the combustion chamber. Intermediate the ends of primary conduit 15 there is provided a normally open electrically actuated valve 17 preferably of the solenoid type having conductors 18, 19 extending therefrom. Conductor 18 is grounded as diagrammatically indicated at 18a while conductor 19 terminates within one of the legs 20 of a mercury manometer 22. A second conductor 23 extends from a source of electrical energy 24 (which is grounded as shown at 24a) into leg 20 and terminates at the same level as conductor 19. With this arrangement, a circuit from the source of power 24 to the valve 17 is completed and the valve is closed when the terminal ends of conductors 19, 23 are immersed in mercury but not when the mercury level is below the terminal ends of these conductors. The opposite leg 21 of manometer 22 is connected by means of a conduit 25 to intake manifold 4 so that the manometer is responsive to the static air pressures developed by the air compressing means. The terminal ends of the conductors 19, 23 should be so located as to be above the level of mercury when the pressure developed by air compressing means 25 is low (e. g. when the engine is idling) and immersed in mercury when high air pressures are developed.

Manometer 22 is preferably provided with a viscous nonconducting liquid, such as engine oil, in each leg thereof as indicated at 26 which has a dampening effect where the invention is incorporated into engines of trucks and buses and some jarring and bumping must be expected. This arrangement prevents splashing of the mercury over the ends of the conductors which would cause erratic opening and closing of valve 17.

Conduit means 15 also includes a by-pass conduit 27 which opens into primary conduit 15a at a point upstream of valve 17 and at a second point downstream from the valve in order to permit flow of limited amounts of air to combustion chamber 12 when valve 17 is closed. As indicated by the drawing, by-pass conduit 27 is of considerably smaller diameter than primary conduit 15. By-pass conduit 27 functions as a throttling means when valve 17 is closed during periods of development of high pressures in intake manifold 4 as will be apparent from the description which follows:

A pipe 8 connects the outlet side of gas mixer 5 and a catalytic chamber 28. This conduit functions to convey the mixture of engine exhausts and combustion products from gas mixer 5 to the catalytic chamber where the oxidizable components of the exhausts are catalytically oxidized. To this end, a plurality of catalytic units 29 are provided within the chamber 28 in such manner that the gases flowing therethrough will be subjected to the catalytic surfaces thereof. Supporting means 30, 31 are provided for the purpose of retaining catalytic units 29 in their proper positions and insulation 32 is provided for the purpose of forcing the gases to flow across, rather than around the catalytic units. Any suitable catalyst may be employed although it should be mentioned that catalytic units of the type described in the copending application Eugene J. Houdry, Serial No. 312,152 filed September 29, 1952 have been found to be particularly satisfactory.

Disposed within pipe 8 is a thermal switch 33 which automatically opens at temperatures above a predetermined minimum and closes when the temperature falls below this minimum. As will be more apparent from the description of the operation of the apparatus, switch 33 should be so adjusted that it will be closed whenever the temperature of the gases flowing through pipe 8 is below the optimum temperature required for catalytic oxidation (e. g. about 900 to 1100° F.). Switch 33 is electrically connected by means of a conductor 34 through a manual switch 35 to conductor 23 which, as previously mentioned, is connected to power source 24. Manual switch 35 is preferably located adjacent the controls for the engine so that the operator thereof may close it at the time the engine is started. Switch 33 is also electrically connected by means of a conductor 36 through a spark coil 37 and condenser 38 to spark plug 16. A second conductor 39 from switch 33 is connected with conductor 19 which as previously described, is electrically connected to electrically actuated valve 17.

The device operates as follows. When the engine is started or immediately thereafter, the operator closes manual switch 35 thereby completing a circuit from power source 24 through switches 35, 33 through spark plug 16 and through conductor 39 to electrically actuated valve 17. Under these circumstances valve 17 will be closed to thereby limit air flow to the combustion chamber and spark plug 16 will be energized. Switch 33 will, of course, be closed since the temperature of the exhaust gases flowing through pipe 8 will be relatively low. At the same time fuel will flow through line 14 and be atomized by nozzle 14a. Combustion will then be initiated within combustion chamber 12 and the hot combustion products thereof will flow, as indicated by the arrows, into gas mixer 5 where they will be mixed with exhaust gases which will be within a temperature range of about 200 to 250° F. The resultant mixture will then flow through pipe 8 to catalytic chamber 28.

The temperature of this resultant mixture will soon reach the required level for catalytic purification (i. e. 900–1100°F.) and exhaust purification will proceed. At this point switch 33 will open under the influence of the elevated gas temperatures and thereby break the circuit through spark plug 16 and valve 17. Valve 17 will automatically open to permit full utilization of the low air pressures developed by the engine air compressing means under idling conditions. It is understood that during this starting cycle the level of mercury in leg 20 of manometer 22 will be below the terminal ends of conductors 19, 23 so that valve 17 will be closed only while switch 33 is closed.

As previously explained, when engine speed is increased, the pressure developed by the engine air compressing means will increase. For example, in the case of a high speed diesel engine, the air pressures developed by a Roots type blower will vary between about 2″ Hg at idle to about 15″ Hg at high engine speeds. The terminal ends of conductors 20 should be so disposed that they will be immersed in mercury when the air pressure in manifold 4 exceeds about 4″ or 6″ of Hg. Therefore, when the engine speed is increased a circuit will be completed from power source 24 through the terminal ends of conductors 19, 23 to valve 17 to effect closure thereof. As a result, the flow of air from manifold 4 to combustion chamber 12 will be throttled by by-pass conduit 27 and blow-out of the flame in the combustion chamber will be prevented.

The operation of this aspect of the invention is more clearly shown in the idealized curves of Fig. 2 in which the abscissa represents the speed of the engine and the ordinate represents pressure P and pressure drop $\Delta p$. Curve A represents the pressure developed by a Roots-type blower operated in conjunction with the engine for the purpose of providing scavenging air for the engine cylinders. As is evident from the slope of this curve, the pressure developed by the blower increases at a considerably greater rate than engine speed in the range from idling conditions (speed $S_1$) to governed or operating engine speed $S_3$. The point $S_2$ on the abscissa represents the engine speed corresponding to the pressure $P_2$ at which valve 17 is automatically closed by manometer switch 22.

The curve B of Fig. 2 represents the pressure drop which takes place in the conduit system 15. This pressured rop is relatively low at idling speed $S_1$ and increases slightly as the engine speed is increased to $S_2$. When the engine speed reaches or exceeds speed $S_2$ the pressure developed in the intake manifold 4 reaches the level at which the valve 17 is automatically closed by manometer switch 22. When this happens the pressure drop in the system abruptly increases, as represented by the upward displacement of the curve, because of the throttling effect achieved when valve 17 is closed and by-pass 27 provides the only path for air flow from manifold 4 to burner 12. At speeds above $S_2$ this pressure drop increases with speed as indicated by the slope of the curve, since the comparatively high pressure air from manifold 4 is throttled by the by-pass 27.

Curve C represents the variation of the pressure drop across the burner 12 with engine speed. This pressure drop, as previously explained, must be maintained within limits such that sufficient quantities of air will flow into the burner to permit complete combustion of the fuel injected by nozzle 14a. On the other hand, the pressure drop across the burner must not be excessive in order to avoid dilution of the products of combustion with large quantities of excess air (which would have the effect of decreasing their temperature) and/or blow out of the flame. On the differential pressure ordinate of Fig. 2, the practical upper and lower limits of the pressure drop across the burner have been designated $\Delta p''$ and $\Delta p'$ respectively.

Curve C clearly shows that as the engine speed is increased from $S_1$ to $S_2$ the pressure drop increases but when valve 17 is closed at speed $S_2$ this pressure drop is abruptly reduced. From speed $S_2$ to speed $S_3$ of course, the pressure drop across the burner increases somewhat but does not exceed the upper limit $p''$.

If during normal operation of the engine the flame in combustion chamber 12 should be extinguished, the temperature of the gases flowing through pipe 8 will fall and switch 33 will automatically close thereby energizing spark plug 16. The fuel being injected into combustion chamber 12 will then be re-ignited in the manner described above with reference to the starting procedure of the apparatus. Switch 33, in effect, detects the presence or absence of combustion in combustion chamber 12 and permits ignition or re-ignition when no combustion is taking place. It should be mentioned that the disclosed location of switch 33 (in the pipe 8) is preferable to location of this switch within the combustion chamber for the reason that a short time lag between the initiation of combustion and de-energization of spark plug 16 is desirable. If the switch were to be located within chamber 12, it would be subjected to the radiant effect of the refractory lining thereof, so that if the flame were to be extinguished during operation of the apparatus, there would be a considerable time lag while the lining cooled before the switch would close. This would obviously be undesirable since the fuel should be re-ignited as soon as possible in order to permit catalytic exhaust purification to resume.

With the disclosed embodiment, when the engine is initially started, the air pressure developed in intake manifold 4 will be low, of the order of 2" to 3" of Hg since the operator will ordinarily permit the engine to idle for at least a short time before loading it. During this period the valve 17 will be closed by virtue of the fact that thermal switch 33 will be closed. As a result the air delivered through by-pass conduit 27 to the combustion chamber will be under a particularly low pressure since the low pressure air of the manifold is being throttled. This is desirable for initial start up when the refractory linings of the combustion chamber and the passageway 11 are cold. On the other hand, if the flame is for any reason extinguished during normal operation at a relatively high engine speed, the air supplied through by-pass conduit 27 to the combustion chamber for re-ignition will be under a relatively higher pressure than at start up (even though the valve 17 is closed in both instances) for the reason that at higher engine speeds the air pressure developed in intake manifold 4 will be relatively high (e. g. of the order of 12" to 15" of Hg). This condition will not interfere with effective and rapid re-ignition since the refractory linings of the passageway and combustion chamber will be at a relatively high temperature.

While a preferred embodiment of the invention has been shown and described, obvious modifications within the scope of the appended claims will be apparent to those skilled in the art. It is contemplated that under some circumstances it might be feasible to substitute a conventional diaphragm-type pressure sensitive switch for the manometer switch 22 in installations involving stationary engines. For vehicular installations, however, the disclosed manometer switch will, in general, be preferable because of its greater reliability under the rigorous operating conditions involving jolting, tilting, etc., inherent in over-the-road travel.

It is also contemplated that under some circumstances it might prove feasible to eliminate by-pass conduit 27 and utilize a solenoid valve capable of permitting the passage of limited amounts of air when in the closed condition. This could be accomplished by merely providing an aperture in the closing gate or other closing member of the valve.

Other obvious modifications will be apparent to those skilled in the art to which the invention appertains.

I claim:

1. Apparatus for controlling the air supply for the combustion chamber of the catalytic exhaust purification system of an internal combustion engine and for igniting an air fuel mixture within said combustion chamber, said engine having associated therewith air compressing means developing air pressures varying with the speed of said engine and a source of electrical energy, said apparatus comprising conduit means for accommodating the flow of air from said air compressing means to said combustion chamber, an electrically actuated valve in said conduit, by-pass means associated with said valve to permit limited air flow through said conduit means upon closing of said valve, pressure-responsive switch means responsive to air pressures developed by said air compressing means, said switch means and said electrically actuated valve means being electrically connected to each other and to said source of electrical energy by electrical conductors in such manner that flow of air through said conduit means is restricted by closure of said valve means during periods of development of relatively high air pressures by said air compressing means, electrical ignition means for igniting air-fuel mixtures within said combustion chamber, temperature responsive switch means disposed downstream from said combustion chamber operative to detect the presence or absence of combustion in said combustion chamber, said temperature-responsive switch means, said ignition means and said electrically-responsive valve means being electrically connected to said source of electrical energy in such manner that in the absence of combustion in said combustion chamber said valve means is closed, flow of air through said conduit means is restricted, and said electrical ignition means is energized to thereby permit initiation of combustion in said combustion chamber.

2. Apparatus as set forth in claim 1 in which said pressure responsive switch comprises a mercury manometer having one leg thereof connected to said air compressing means and in which said electrical conductors provide terminal portions disposed within the other leg of said manometer, said terminal portions of said electrical conductors being located so as to be above the level of mercury during periods of development of low pressures and to be immersed in mercury during periods of development of high pressures to thereby effect actuation and closure of said valve during periods of development of high air pressures.

3. Apparatus as set forth in claim 2 in which said manometer contains a relatively viscous non-conducting fluid in each leg thereof above the mercury therein, said fluid serving as a damping means to prevent splashing of said mercury.

4. Apparatus as set forth in claim 1 in which said conduit means comprise a primary conduit and a reduced diameter by-pass conduit, said electrically actuated valve being disposed in said primary conduit, said by-pass conduit being operative to permit by-passing of a limited air flow around said valve means to thereby permit said restricted flow of air to said combustion chamber.

5. Means for supplying air to the combustion chamber of a catalytic exhaust purification system of an internal combustion engine, said engine having associated therewith air compressing means for supplying air under pressure to the engine, said air compressing means being responsive to, and developing air pressures varying with, the speed of said engine, means for controlling the air flow in said conduit at varying engine speeds, said means including a valve located in said conduit and having flow-restricting means associated therewith, means connected to said air compressing means for detecting the air pressure developed thereby at varying engine speeds, said pressure-detecting means being operatively connected to said valve to actuate said valve when the air pressure developed by said air compressing means exceeds a predetermined value thus to limit the flow of air to said combustion chamber during periods of development of high pressures by said air compressing means.

6. Means for supplying air to the combustion chamber of a catalytic exhaust purification system of an internal combustion engine, said engine having associated therewith air compressing means for supplying air under pressure to the engine, said air compressing means being responsive to, and developing air pressures varying with the speed of said engine, said means for supplying air comprising conduit means connecting said combustion chamber and said air compressing means, valve means disposed within said conduit means, by-pass means associated with said valve and operative upon closure of said valve to restrict the flow of air from said air compressing means to said combustion chamber, pressure sensitive valve control means responsive to air pressures developed by said air compressing means, said valve control means being operative to close said valve means during periods of development of high air pressures by said air compressing means to thereby limit the flow of air to said combustion chamber while permitting the flow of sufficient quantities of air to sustain combustion in said combustion chamber.

7. In an internal combustion engine having appurtenant thereto air compressing means responsive to the speed of said engine for supplying air under pressure to the engine, an exhaust pipe for exhausting combustion products from the engine cylinders, a combustion chamber opening into said exhaust pipe, said combustion chamber being adapted to the burning of fuel therein to produce a hot gaseous stream which is intermixed with said combustion products thereby raising the temperature of said combustion products, and an oxidation catalyst disposed downstream from said combustion chamber adapted to effect catalytic oxidation of the oxidizable components of said combustion products, the improvement comprising, conduit means extending from said air compressing means to said combustion chamber, an electrically actuated valve in said conduit means, electrical conductors operative to carry an electrical current to close said valve, a mercury manometer responsive to the pressure in said air line, said electrical conductors having terminal portions disposed within said manometer such that at relatively low pressures in said air line, said terminal ends are above the level of mercury in said manometer and at relatively high pressure in said air line said terminal ends are immersed in mercury within said manometer whereby said valve is open at low engine speeds and air pressures and is closed at high engine speeds and air pressures, constricted air flow means operative to permit flow of air when said valve is closed an air pressure within said line is relatively high, said constricted air flow means being operative to permit flow of sufficient quantities of relatively high pressure air to sustain combustion of fuel in said combustion chamber while preventing excessive flow at high engine speeds such as would interfere with combustion.

References Cited in the file of this patent
UNITED STATES PATENTS 1,605,484     Thompson et al. _____ Nov. 2, 1926